United States Patent
Harshbarger et al.

(10) Patent No.: US 6,267,807 B1
(45) Date of Patent: *Jul. 31, 2001

(54) METHOD FOR GRINDING COLORANTS

(75) Inventors: Kenneth James Harshbarger; Ajay Kanubhai Suthar, both of Lexington; Richard Barber Watkins, Frankfort; Austin Keith Wickline, Stanton, all of KY (US)

(73) Assignee: Lexmark International, Inc., Lexington, KY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/855,178

(22) Filed: May 13, 1997

Related U.S. Application Data

(63) Continuation-in-part of application No. 08/667,269, filed on Jun. 20, 1996, now Pat. No. 5,719,204.

(51) Int. Cl.[7] .............................. C09B 67/48; C09D 11/02
(52) U.S. Cl. ....................... 106/31.65; 523/161; 523/351; 260/DIG. 38; 427/218; 347/100; 106/31.65; 106/412
(58) Field of Search ................................... 523/161, 351; 260/DIG. 38; 427/218; 106/31.65, 412; 347/100

(56) References Cited

U.S. PATENT DOCUMENTS

| | | | |
|---|---|---|---|
| H564 | 1/1989 | Allen, III et al. ................. | 106/497 |
| 4,946,766 | 8/1990 | Fukagai ................................. | 430/60 |
| 5,135,829 | 8/1992 | Fukagai et al. ........................ | 430/60 |
| 5,260,195 | 11/1993 | Azhar et al. ........................... | 435/25 |
| 5,270,293 | 12/1993 | Schulze et al. .......................... | 505/1 |
| 5,409,415 | 4/1995 | Kawanami et al. ................... | 451/39 |
| 5,460,770 | 10/1995 | Egerton et al. ..................... | 264/340 |
| 5,502,012 | 3/1996 | Bert et al. ............................ | 501/103 |
| 5,538,549 | 7/1996 | Kato et al. . | |
| 5,589,522 | * 12/1996 | Beash et al. ......................... | 523/160 |
| 5,670,561 | * 9/1997 | Scheibelhoffer et al. .......... | 523/351 |
| 5,679,138 | * 10/1997 | Bishop et al. ....................... | 106/200 |
| 5,719,204 | * 2/1998 | Beash et al. ........................ | 523/161 |

FOREIGN PATENT DOCUMENTS

| | | | |
|---|---|---|---|
| 196 18 056 | 1/1997 | (DE) . | |
| 567 136 A1 | 10/1993 | (EP) | ............... C04B/35/48 |
| 578 463 A1 | 1/1994 | (EP) | ............... B24C/11/00 |
| 684 519 | 11/1995 | (EP) . | |
| 776 952 | 6/1997 | (EP) . | |
| WO 93/23347 | 11/1993 | (WO) | ............... C04B/35/48 |

OTHER PUBLICATIONS

Communication, European search report, Application No. 98303717.7–2110, 3 pages.
YTZ Grinding Media, Technical Bulletin, Tosoh Corporation, Tokyo, Japan, Apr. 1993.
A Comparision Of Zirconia Ceramic Grinding Media, Powder and Bulk Engineering, Tosoh Corporation, Jun., 1994.

* cited by examiner

*Primary Examiner*—Elizabeth M. Cole
*Assistant Examiner*—John J. Guarriello
(74) *Attorney, Agent, or Firm*—John A. Brady

(57) ABSTRACT

A method for grinding colorant agglomerates with a grinding medium comprising a Group IIIB and/or a lanthanide element and a Group IVB oxide. The grinding medium has a grain size of less than about 1.35 microns, and results in the production of substantially pure colorant concentrates.

26 Claims, No Drawings

METHOD FOR GRINDING COLORANTS

This invention is a continuation in part of U.S. Ser. No. 08/667,269, filed Jun. 20, 1996, entitled, "Polymeric Dispersants For Pigmented Inks", now U.S. Pat. No. 5,719,204.

FIELD OF THE INVENTION

This invention relates to a novel method for grinding a colorant agglomerate. More particularly, the instant invention is directed to a method for dispersing a pigment agglomerate in a carrier liquid by grinding said pigment agglomerate in the carrier liquid with a mill and a small size grain ceramic medium.

BACKGROUND OF THE INVENTION

Ink jet printing is a conventional technique by which printing is normally accomplished without contact between the printing apparatus and the substrate on which the desired print characters are deposited. Such printing is accomplished by ejecting ink from an ink jet printhead of the printing apparatus via numerous methods which employ, for example, pressurized nozzles, electrostatic fields, piezo-electric elements and/or heaters for vapor phase bubble formation.

The ink compositions used in ink jet printing typically employ, for example, water, colorants and low molecular weight water-miscible solvents. The colorants which may be employed include dyes or pigments. Pigments often are preferred and they are generally characterized as colorants that are not soluble in the desired liquid vehicle of an ink composition. In order to prepare a pigment-based ink, therefore, pigment agglomerates typically are dispersed in a dispersant so that the resulting colorant concentrate can be added to the liquid vehicle to produce an ink.

When preparing the colorant concentrate, pigment agglomerates are typically reduced in size and dispersed in a dispersant. This often is achieved by mixing the pigments with the dispersant, followed by a grinding step. The grinding step may take place in commercially available ink preparation mills like ball and pebble mills. When grinding in these types of mills, conventional grinding media such as glass, stainless steel and zirconium oxide often are employed in order to enhance the grinding process. Unfortunately, however, conventional grinding media enhance the grinding process while simultaneously decreasing the purity of the resulting colorant concentrate, or the subsequent ink composition prepared therefrom. Such a decrease in purity can result in ink discolorations, ink pH alterations and malfunction of printing apparatuses.

It is of increasing interest to prepare colorant concentrates that are substantially pure. This invention, therefore, is directed to a novel method for grinding colorants with, for example, a small grain size grinding medium, to unexpectedly produce a substantially pure colorant concentrate. "Substantially pure", as used herein, is defined to mean less than 0.04%, and preferably, less than about 0.03%, and most preferably, less than about 0.025% impurities by weight, based on total weight of the colorant concentrate, as determined by Inductively Coupled Plasma-Atomic Emission Spectroscopy. Such impurities originate from the grinding media and/or the mill employed.

DESCRIPTION OF THE PRIOR ART

Efforts have been disclosed for preparing pigment-based ink compositions. In U.S. Pat. No. 5,589,522, assigned to Lexmark International, Inc., aqueous pigment based ink compositions comprising a compositions. In U.S. patent application Ser. No. 08/667,268, now U.S. Pat. No. 5,656,071 assigned to Lexmark International, Inc., pigment-based ink compositions comprising a diol-containing cosolvent are described.

SUMMARY OF THE INVENTION

In a first aspect, the instant invention is directed to a method for making a colorant concentrate comprising the steps of:
(a) combining a colorant and a carrier liquid to produce a premix; and
(b) grinding said premix in a mill comprising a grinding medium having a grain size of less than about 1.35 microns.

In a second aspect, the instant invention is directed to a colorant concentrate made by the novel method described in the first aspect of this invention.

In a third aspect, the instant invention is directed to an ink composition prepared from the colorant concentrates described above.

DETAILED DESCRIPTION OF THE PREFERRED EMBODIMENTS

"Colorant" is defined herein to mean an insoluble additive capable of generating a color in a liquid and/or on a substrate. Preferred colorants which may be employed in this invention include pigments. There is no limitation with respect to the pigments that may be employed in this invention other than that they are capable of resulting in an ink. Any of the commonly employed organic or inorganic pigments may be used. An illustrative list of the pigments which may be employed in this invention includes azo pigments such as condensed and chelate azo pigments, and polycyclic pigments such as phthalocyanines, anthraquinones, quinacridones, thioindigoids, isoindolinones, and quinophthalones. Still other pigments which may be employed include, for example, nitro pigments, daylight fluorescent pigments, carbonates, chromates, titanium oxides, zinc oxides, iron oxides and carbon black. Preferred pigments employed in this invention include carbon black and pigments capable of generating a cyan, magenta and yellow ink. The pigments employable in this invention may be prepared via conventional techniques, are typically commercially available, and often listed as, for example, a specific yellow, orange, red, blue, green, violet or black on the Colour Index.

It should be further noted herein that the colorants employed in this invention may be referred to as colorant agglomerates or agglomerates, whereby agglomerate is meant to mean a combination or cluster of colorant particles. The colorant agglomerates, prior to grinding, typically have an approximate diameter of about 700 nm to about 1,100 nm. "Carrier liquid", as defined herein, is meant to mean any liquid, including mixtures, capable of suspending the colorant. The carrier liquid may be aqueous or non-aqueous. When an aqueous carrier is preferred, it is often selected from the group consisting of water, distilled water and deionized water. The aqueous carrier may also include mixtures having at least two members selected from the group consisting of water, distilled water, deionized water and a miscible organic solvent. An illustrative list of the miscible organic solvents which may be employed include glycols (like ethylene glycol), alcohols (like 1-propanol), glycol-ethers (like polyethylene glycol), diols (like propane diol), or mixtures prepared therefrom. The preferred aqueous carrier is deionized water.

There is essentially no limitation with respect to the non-aqueous carrier liquids which may be employed in this invention other than that they are capable of suspending the colorant. An illustrative list of the non-aqueous carrier liquids that may be employed in this invention include oils such as mineral oil, tung oil, and soybean oil as well as organic solvents such as polyethylene glycol, glycerol and 2-pyrrolidinone.

When the colorant and the carrier liquid are combined (e.g., in a beaker or a conventional mixing vessel), the resulting mixture is referred to as a premix. Formation of the premix may be enhanced by, for example, stirring, mixing, shaking or agitating (via any art-recognized technique) the colorant and carrier liquid to ensure that the colorant is wetted and suspended therein.

When the carrier liquid is a mixture, it typically has from about 5.0% to about 95.0%, and preferably, from about 10.0% to about 80.0%, and most preferably, from about 20.0% to about 70.0% by weight miscible organic solvent, based on total weight of the carrier liquid, including all ranges subsumed therein.

The premix typically comprises no more than about 35.0%, and preferably, no more than about 20.0%, and most preferably, no more than about 10.0% by weight of colorant agglomerate (e.g., pigment) based on total weight of the premix.

Subsequent to premix preparation, the premix is added to a mill such as one conventionally used for making ink compositions. An illustrative list of the mills which may be employed include, for example, ball mills, pebble mills, fine media mills, bead mills, as well as shot mills. Such mills are commercially available and described in texts such as *Paint Flow and Paint Dispersion,* Second Edition, 1979, by John Wiley & Sons, Inc.

The grinding media employed in this invention have the capability of grinding the colorant agglomerates of the premix in such a way that the size of the approximate diameter of the agglomerates can be reduced, resulting in colorant particles or colorant aggregates (agglomerates of reduced size). Thus, the grinding media is of sufficient hardness and toughness so that it is not destroyed in the grinding process. "Approximate diameter" is defined to mean an estimate of the agglomerate diameter. Such diameters are discussed herein since colorant agglomerates are not typically perfect spheres capable of more exacting diameter measurement. There is essentially no limitation with respect to the reduction of the agglomerate diameters, and the agglomerates may be reduced to their primary particle (single particle) size. Often, however, the agglomerates are reduced to aggregates wherein their approximate diameter is reduced to less than about 600 nm, and preferably, less than about 400 nm, and most preferably, less than about 200 nm, including all ranges subsumed therein.

The grinding media employed in this invention, again, have grain sizes of less than about 1.35 microns. Preferably, however, the grain sizes are less than about 1.0 micron, and most preferably, less than about 0.5 micron including, all ranges subsumed therein. A "grain" is typically identified as a portion of the grinding medium having a homogeneous crystallographic orientation, surrounded by other grains having a different crystallographic orientation.

The grinding medium employed in this invention is preferably a ceramic material comprising:

(a) at least one member selected from the group consisting of a Group IIIB metal and a lanthanide; and (b) a Group IVB oxide.

"Ceramic" as used herein is defined to mean a material made by, for example, a process which relies on the action of heat. Such a process is often a firing or sintering process. Moreover, when such a ceramic is made, the Group IIIB metal and/or lanthanide acts to stabilize the Group IVB oxide.

Often, the grinding medium is about 80.0%, and preferably, about 85.0%, and most preferably, about 90.0% by weight Group IVB oxide, based on total weight of the grinding medium. The most preferred grinding medium is one consisting of yttrium as the Group IIIB metal and zirconia as the Group IVB oxide (YTZ), including those which are commercially available from, for example, S.E. Firestone Assoc., Inc.

Group IIIB, lanthanide and Group IVB are defined as the elements described in the Periodic Table of *Handbook of Chemistry and Physics,* 56 th Edition, 1975–1976, as published by CRC Press.

There is generally no limitation with respect to the shape of the grinding media other than that the grinding media is in a shape that is useful for grinding colorant agglomerates. Often, the grinding media is spherical, cylindrical or cubical. Preferably, the grinding media is spherical and has a diameter of about 0.1 mm to about 25.0mm, including all ranges subsumed therein.

It is further noted herein that the carrier liquid employed in this invention may be, and preferably is, combined with an art-recognized dispersant. When combined with an art recognized dispersant, the resulting carrier liquid-dispersant mixture typically comprises no more than about 40.0%, and preferably, no more than about 30.0%, and most preferably, no more than about 25.0% by weight dispersant, based on total weight of the mixture. The carrier liquid could, if desired, comprise 100% dispersant if the dispersant is a liquid at about ambient temperature.

There is essentially no limitation with respect to the dispersants which may be employed in this invention. In fact, any polymeric or non-polymeric dispersant which may be used to disperse a colorant in an ink composition may be employed in this invention. An illustrative list of non-polymeric dispersants include naphthalene sulfonic acid, sodium lignosulfate and glyceryl stearate. An illustrative list of the polymeric dispersants includes random, block and branched polymers, whereby the polymers may be anionic, cationic or nonionic in nature. When an aqueous carrier liquid is employed, the polymeric dispersants typically have hydrophilic segments for aqueous solubility and hydrophobic segments for pigment interaction. Moreover, polymeric dispersants as used herein are meant to include homopolymers, copolymers (including terpolymers), immiscible blends and miscible blends.

Since the polymeric dispersants in this invention generally are only limited to the extent that they are capable of dispersing a colorant in an ink composition, the precursor units which may be used to make such polymeric dispersants are not limited. "Precursor", as used herein, is meant to include monomeric and macromeric units.

A general list of the monomeric units which may be employed to make such polymeric dispersants include, for example, acrylic monomers, styrene monomers and monomers having amine groups. Illustrative examples of the monomers which may be employed include acrylic and methacrylic acid, acrylamide and methacrylamide.

The polymeric dispersants often employed tend to be any of those which are commercially available as well as the polymeric dispersants which may be made via conventional techniques which include, for instance, cationic, anionic, group transfer or free radical polymerizations of monomeric units.

The often preferred polymeric dispersants which may be employed in this invention are random terpolymers prepared from three specific precursors. The often preferred precursors include monomeric and macromeric precursors, including at least one member selected from the group consisting of acrylates and methacrylates, at least one member selected from the group consisting of acryloyl- and methacryloyl-terminated polydialkylsiloxanes and at least one member selected from the group consisting of stearyl acrylate, stearyl methacrylate, lauryl acrylate and lauryl methacrylate. Dispersants prepared with methacrylate, methacryloyl-terminated polydimethylsiloxane and stearyl methacrylate (22:1:1 molar ratio, respectively) are the most preferred.

The polymeric dispersants prepared from these precursors may be made by polymerizing the monomeric and macromeric precursors via art-recognized techniques, which include free radical polymerizations. A more detailed description of the most preferred polymeric dispersants which may be employed in this invention may be found in U.S. patent application Ser. No. 08/578,138, now U.S. Pat. No. 5,714,538 and Ser. No. 08/667,269, now U.S. Pat. No. 5,719,204 the disclosures of which are incorporated herein by reference.

Generally, when preparing inks from the colorant concentrate made in this invention, the carrier liquid, dispersant and colorant are, for example, combined and mixed. The resulting premix is transferred into a conventional mill, and preferably, a fine media mill.

The mills employed typically comprise a grinding chamber, and the grinding chamber often comprises about 10.0% to about 95.0%, and preferably, from about 60.0% to about 90.0% by volume of grinding media, based on total volume of the grinding chamber, including all ranges subsumed therein.

Subsequent to transferring of the premix to the mill, the premix is ground. There is generally no limitation with respect to the amount of time the grinding takes place. The only limitation is that the resulting colorant concentrate may be employed to produce an ink capable of being printed on a substrate.

Most preferably, the grinding of the premix in the mill occurs for a time period which results in a colorant concentrate having colorant aggregates of less than about 200 microns. Such a colorant concentrate is preferably used to make ink jet ink compositions capable of being used in ink jet printers such as the 2030, 2050 and 7000 ink jet printers made and manufactured by Lexmark International, Inc. of Lexington, Ky. When employed in such printers, the inks are added to ink jet print cartridges, which may be removed and/or refilled. The ink jet print cartridges typically have at least one ink flow pathway extending from at least one ink reservoir chamber to an ink jet printhead. A more detailed description of an illustrative print cartridge is described in U.S. Pat. No. 5,576,750, assigned to Lexmark International, Inc., the disclosure of which is incorporated herein by reference.

Once grinding is complete, the resulting colorant concentrate is isolated from the mill and grinding media by, for example, a filtration step. At this point, the colorant concentrate is ready to be used to prepare an ink composition.

The ink composition generally is made by mixing the colorant concentrate and ink components in an art-recognized mixing vessel such as a beaker. Ink components include, for example, humectants like glycerol and sorbitol; biocides; fungicides; bacteriocides; penetrants like 1,2-hexanediol and acetylene derived compounds; surfactants like polyorganosiloxanes; anti-kogation agents; anti-curling agents; buffers; chelating agents like EDTA, and anti-bleed agents. It is within the scope of this invention to add some ink components to the premix generating step, with the proviso that such ink components do not interfere with the generation of a colorant concentrate. In an often preferred embodiment, biocide is added with the carrier liquid and colorant when the premix is being made.

There is generally no limitation with respect to the order by which the ink components and colorant concentrate are added to the mixing vessel.

The only limitation is that the resulting composition is an ink composition capable of being printed on a substrate. Again, any mixing, stirring or agitating steps may be employed in this invention to enhance ink composition formation. Further, it is within the scope of this invention to perform the mixing, stirring or agitating steps at ambient temperature and atmospheric pressure; however, pressure and temperature variations may be made to assist in the formation of the colorant concentrate and ink compositions prepared therefrom. Additionally, it should be noted that the processes described in this invention may be batch or continuous.

The following Example is provided to illustrate and facilitate an understanding of this invention. The Example is not intended to limit the instant invention.

EXAMPLE

A reaction vessel was charged with a solution made with 22.8 g (265 mmol) of methacrylic acid, 7.84 g ( 8.7 mmol) of monomethacryloxypropyl-terminated polydimethylsiloxane, 2.95 g (8.7 mmol) of stearyl methacrylate, 2.06 g (9.9 mmol ) of 1-dodecanethiol, 0.64 g (2.84 mmol) of dimethyl 2,2-azobisisobutyrate and 100 mL of isopropyl alcohol. The resulting mixture was degassed with argon (done by repeated partial evacuation followed by argon backfill using a Firestone Valve) then heated to 70° C. for about 16 hours. The mixture was allowed to cool to about room temperature and subsequently added slowly to 1.0L of hexane while stirring. The resulting solid product (polymeric dispersant) was isolated by vacuum filtration and dried in a vacuum overnight at 80° C. The yield of the reaction was about 85%. The dried polymeric dispersant recovered (the preferred dispersant in this invention) was characterized by proton NMR and GPC analysis.

A stock solution of the polymeric dispersant was prepared by charging a 400 mL beaker, on a hot plate with a magnetic stirrer, with 40.0 g of deionized water. Added to the beaker with deionized water was 12.0 g of dried polymeric dispersant and 18.0 g of20% KOH. The resulting mixture was heated to about 50° C. for about 2 hours. The pH of the mixture was adjusted to 7.5 by the addition of 20% KOH. Deionized water was then added to the mixture to bring the weight of the resulting solution to 100.0 g (12% polymeric dispersant).

A second beaker was then charged with 133.33 g of the polymeric dispersant solution prepared above, 202.67 g of deionized water and 64.0 g of carbon black. The contents were stirred with a commercial mixer. The resulting mixture was then added to a mill (fine media mill available from Premier, Inc.) having a 0.8mm yttrium stabilized zirconia grinding medium. The grinding chamber of the mill was filled with about 80.0% by volume of the media. The mixture was ground for about 90 minutes, resulting in a carbon black concentrate which unexpectedly displayed less than about 0.02% impurities as determined by Inductively Coupled Plasma-Atomic Emission Spectroscopy (ICP analysis).

A third beaker was charged with 10.0 g of polyethylene glycol having a weight average molecular weight of about 400. 10.0 g of 1,3-propanediol were then added while stirring with a magnetic stir bar. After a homogeneous mixture resulted, 61.05 g of deionized water were added while stirring. To the resulting mixture, 0.20 g of commercially available biocide solution having 1,2-benzisothiazolin-3-one were added with stirring, resulting in an ink vehicle.

A final beaker was charged with 18.75 g of the carbon black concentrate prepared above, and the entire ink vehicle produced above was slowly added while stirring. The resulting composition was filtered to 1.2 microns using a commercially available pressurized filtration apparatus having a series of disk filters. The resulting filtered solution is a substantially pure carbon black ink composition.

The data in the Table which follows is provided to demonstrate the unexpected and superior properties obtained in the instant invention. All colorant concentrates depicted as entries have been prepared in a manner similar to the one described in the Example, except that conventional grinding media was employed in lieu of yttrium stabilized zirconia.

TABLE

| Entry (Colorant Concentrate) | Conventional Grinding Media[A] | Contamination Level[B] |
|---|---|---|
| 1 | Stainless Steel | 0.04% |
| 2 | Zirconium Silicate | 0.65% |
| 3 | Zirconium Oxide | 7.62% |
| 4 | Glass | 0.25% |

[A]All conventional grinding media were commerically available; had an average diameter of about 1.0 millimeter.
[B]Contamination Level means the weight % of contaminant based on total weight of colorant concentrate, whereby the contaminant originated from the grinding media and/or the mill. All contamination levels were determined by ICP analysis except the contamination level in entry 3 which was determined with a centrifuge.

The data indicates that the instant invention results in a colorant concentrate with at least about 100.0% less impurities (Example vs. conventional grinding media).

What is claimed is:

1. A method for making a colorant concentrate comprising the steps of:
    (a) combining a colorant and a carrier liquid to produce a premix; and
    (b) grinding said premix in a mill comprising a grinding medium having a grain size of less than about 1.35 microns, said grains being the portions of the grinding medium having a homogeneous crystallographic orientation, surrounded by other such portions.

2. A method in accordance with claim 1 wherein said colorant concentrate is included in an ink jet composition.

3. The method in accordance with claim 2, further comprising the step of adding one or more ink components to the color concentrate to form an ink composition.

4. A method in accordance with claim 2 wherein said colorant is a cyan pigment, magenta pigment, yellow pigment or carbon black.

5. The method in accordance with claim 4, further comprising the step of adding one or more ink components to the color concentrate to form an ink composition.

6. A method in accordance with claim 1 wherein said carrier liquid is aqueous or nonaqueous.

7. The method in accordance with claim 6, further comprising the step of adding one or more ink components to the color concentrate to form an ink composition.

8. A method in accordance with claim 6 wherein said carrier liquid is aqueous and comprises at least two members selected from the group consisting of water, deionized water, distilled water, and an organic solvent.

9. The method in accordance with claim 8, further comprising the step of adding one or more ink components to the color concentrate to form an ink composition.

10. A method in accordance with claim 8 wherein said organic solvent is selected from the group consisting of glycols, alcohols, glycol-ethers and mixtures prepared therefrom.

11. The method in accordance with claim 10, further comprising the step of adding one or more ink components to the color concentrate to form an ink composition.

12. A method in accordance with claim 1 wherein said mill is a ball mill, pebble mill, fine media mill or shot mill.

13. The method in accordance with claim 12, further comprising the step of adding one or more ink components to the concentrate to from an ink composition.

14. A method in accordance with claim 1 wherein said grinding medium is a ceramic material comprising:
    (a) at least one member selected from the group consisting of a Group IIIB metal and a lanthanide; and
    (b) a Group IVB oxide.

15. The method in accordance with claim 14, further comprising the step of adding one or more ink components to the color concentrate to form an ink composition.

16. A method in accordance with claim 14 wherein said grinding medium consists of yttrium and zirconia.

17. The method in accordance with claim 16, further comprising the step of adding one or more ink components to the color concentrate to form an ink composition.

18. A method in accordance with claim 1 wherein said grain size is less than about 0.5 micron.

19. The method in accordance with claim 18, further comprising the step of adding one or more ink components to the color concentrate to form an ink composition.

20. A method in accordance with claim 1 wherein said carrier liquid further comprises a dispersant.

21. The method in accordance with claim 20, further comprising the step of adding one or more ink components to the color concentrate to form an ink composition.

22. A method in accordance with claim 20 wherein said dispersant is a terpolymer prepared from methacrylate, methacryloyl-terminated polydimethylsiloxane and stearyl methacrylate.

23. The method in accordance with claim 22, further comprising the step of adding one or more ink components to the color concentrate to form an ink composition.

24. A method in accordance with claim 1 wherein a biocide is added when producing said premix.

25. The method in accordance with claim 24, further comprising the step of adding one or more ink components to the color concentrate to form an ink composition.

26. The method in accordance with claim 1, further comprising the step of adding one or more ink components to the color concentrate to form an ink composition.

* * * * *